United States Patent
Ramstedt

[11] 3,887,896
[45] June 3, 1975

[54] ACTIVE SONAR IMAGE PERCEPTION

[75] Inventor: Clarence F. Ramstedt, San Diego, Calif.

[73] Assignee: The United States of America as represented by the Secretary of the Navy, Washington, D.C.

[22] Filed: Apr. 18, 1974

[21] Appl. No.: 461,840

[52] U.S. Cl. ............... 340/3 R; 340/6 R; 340/6 M
[51] Int. Cl. .......................... G01s 9/66; G01s 7/54
[58] Field of Search............ 340/3 R, 5 T, 6 M, 6 R

[56] References Cited
UNITED STATES PATENTS
3,445,806  5/1969  Band.................................. 340/6 R
3,789,353  1/1974  Hunter et al....................... 340/5 T Primary Examiner—Richard A. Farley
Attorney, Agent, or Firm—Richard S. Sciascia; Ervin F. Johnston; William T. Skeer

[57] ABSTRACT

A swimmer carried, active sonar system includes a single ensonifying transducer and a pair of stereophonic hydrophones. Echoes from nearby underwater objects impinge on the hydrophones to generate a stereophonic sound pattern. These sound patterns are recorded on magnetic recording medium to be replayed at a reduced speed. The reduced speed reproduction of the recorded sound is reproduced through a binaural headset to assist the diver-operator of the sonar in locating the source of the acoustic echo.

12 Claims, 7 Drawing Figures

PATENTED JUN 3 1975    3,887,896
SHEET 1
FIG.1
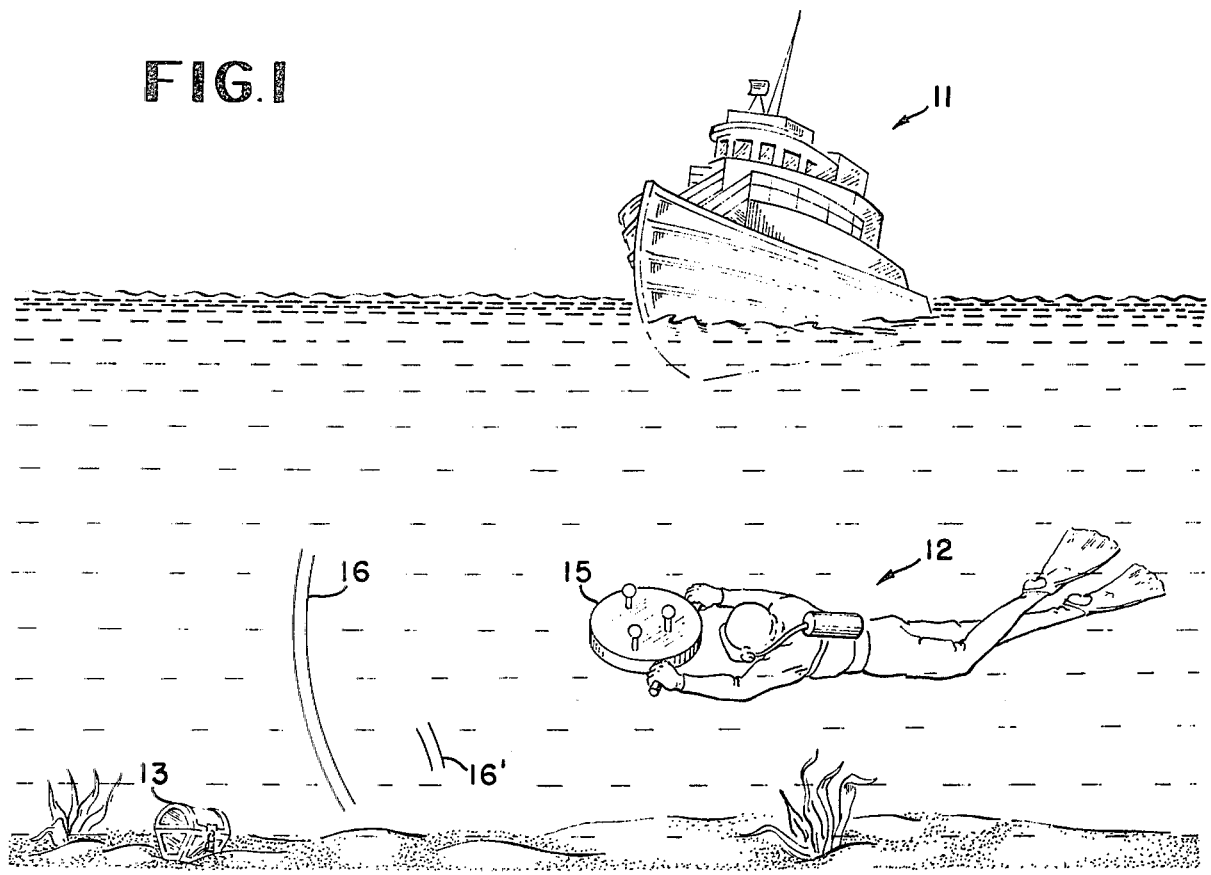
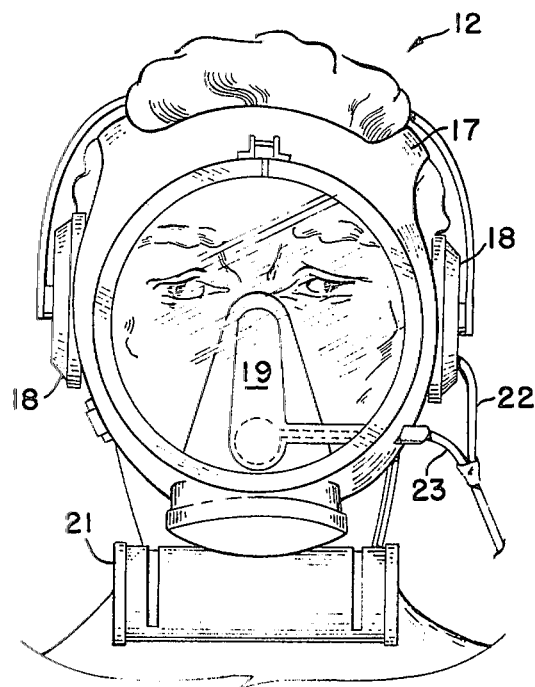
FIG.2
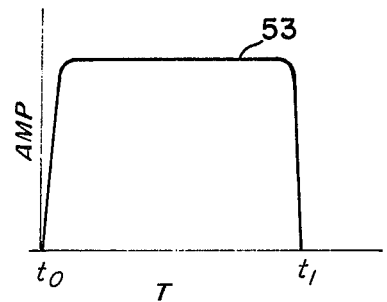
FIG.4
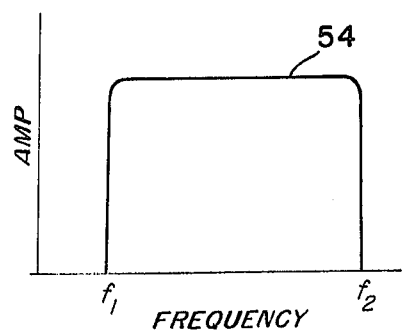
FIG.5

ACTIVE SONAR IMAGE PERCEPTION

STATEMENT OF GOVERMENT INTEREST

The invention described herein may be manufactured and used by or for the Goverment of the United States of America for govermental purposes without the payment of any royalties thereon or therefor.

FIELD OF THE INVENTION

The invention pertains to the field of acoustical physics. More particularly, the invention pertains to underwater sound transmission. In still greater particularity, the invention is directed to a system for locating underwater objects by acoustic ranging techniques. In still greater particularity, the invention pertains to a swimmer carried electroacoustic sonar system. By way of further characterization, but without limitation thereto, the invention pertains to a portable, diver-carried sonar which uses stereophonic signal processing together with binaural imaging techniques and frequency shifting to assist the diver to more rapidly identification and location information.

DESCRIPTION OF THE PRIOR ART

Heretofore, numerous sonar and underwateer ranging systems have been developed. However, systems which are capable of being carried by a swimmer-diver are a relatively recent development. For example, the system illustrated in the "1974 Britanica Yearbook of Science and the Future", published by Encyclopedia Britanica, Inc., Library of Congress catalog number 69-2349 on page 348, may be considered typical. In general, these modern swimmer-diver carried sonars have been developed to provide a visual indication to the diver of objecs lying within a short distance therefrom. Such visual presentation requires an electrical circuit having considerable sophistication. For example, U. S. Pat. No. 3,784,805 issued on Jan. 8, 1974 to A. L. Rolle, for "Sonar Image Converter" is representative of the current state-of-the-art.

Although the aforedescribed systems are satisfactory for their intended purpose and provide worthwhile pieces of equipment for certain applications, there are many instances where a low cost and simpler system would offer advantages over the visual presentation type instruments.

SUMMARY OF THE INVENTION

The invention provides a high resolution, stereophonic sonar system to be carried by a swimmer-diver and functions to enable him to locate objects in darkened or turbid waters with a high degree of accuracy. The invention employs a broadband, active sonar transmitter combined with a pair of stereophonically related sonar receivers which provide a dual output signal which is magnetically recorded. The broadband sonar transmission provides acoustic illumination of underwater objects with a range of wave length generally in or above the high frequency range of human ears, thus enhancing the sound reflections from a variety of sizes of small objects. The magnetic recording of the sonar return signals is recorded simultaneously with clock signals indicating the time of arrival thereof with relation to the transmission pulse. These recorded signals are played back at a reduced rate of speed, thus translating the echo frequency into the normal hearing range to enable the swimmer-diver to more accurately recognize and localize the source of the signals.

STATEMENT OF THE OBJECTS OF INVENTION

It is accordingly an object of this invention to provide an improved sonar system.

A further object of the invention is the provision of a sonar system having auditory information presentation.

Another object of this invention is the provision of a sonar system which may be carred by a swimmer-diver.

Yet another object of this invention is the provision of a sonar system employing a stretched time presentation.

A further; object of this invention is the provision of a swimmer-diver carried sonar employing a stretched-time presentation.

Yet another object of this invention is the provision of a swimmer-diver carried sonar using binaural information presentation.

Still another object of this invention is the provision of a swimmer-diver carred sonar using a binaural information presentation and employing time stretched signal analysis.

These and other objects of the invention will become more readily apparent from the ensuing specification when taken with the drawings.

BRIEF DESCRIPTION OF THE DRAWINGS

FIG. 1 is a perspective view showing the sonar system of the invention in use;

FIG. 2 is a front view of the swimmer-diver showing the binaural transducers;

FIG. 4 is a graphic illustration of the transmitter pulse employing signal amplitude against time;

FIG. 5 is a graphic representation of the transmitter pulse plotting signal amplitude aganist signal frequency.

DESCRIPTION OF THE PREFERRED EMBODIMENT

Figure 3:
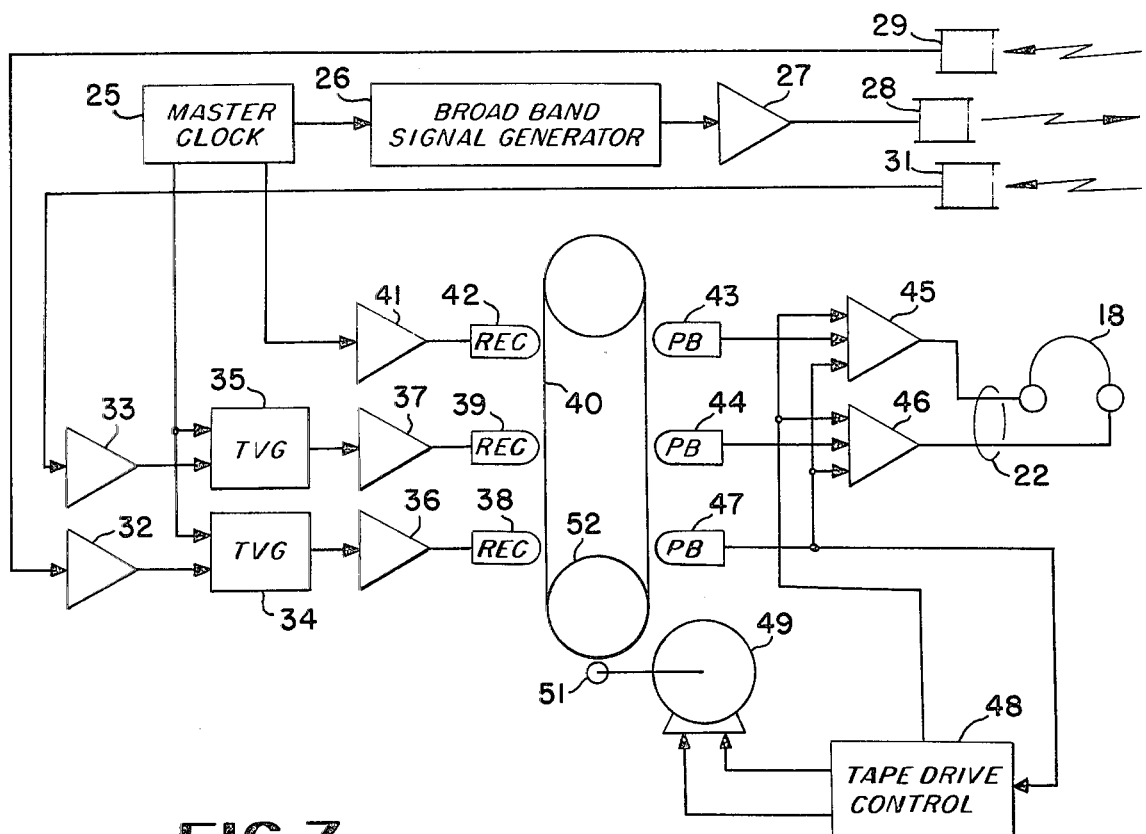
FIG. 3 is a schematic representation of the major components comprising the sonar system of the invention.

Referring to FIG. 1 a salvage vessel 11 maintains a surface station from which dier 12 is deployed. Swimmer-diver 12 is shown approaching an underwater object 13. A hand held sonar 15 ensonifies the area ahead of diver 12 with a series of acoustic pulses 16. Acoustic pulses 16, upon impinging object 13, create an echo return pulse 16' which is detected by hand held sonar 15.

Referring to FIG. 2, swimmer-diver 12 is shown wearing a face mask 17 and acoustic binaural receivers 18. Mask 17 includes a breathing mouthpiece 19, which fits over the nose and mouth area of swimmer-diver 12. This mouthpiece provides a breathing gas mixture by means of a fitting 21, which is connected by breathing conduit, not shown, to a back carried cylinder of breathing gas. Binaural earphones 18 are used in conjunction with a microphone in a diver communication system. Electical connection to receivers 18 is made by conductor 22 while a similar conductor 23 provides electrical connections to the microphone. Of course, conductors 22 and 23 may be combined into a single cable, as shown.

The receivers 18 and microphone contained with the mouthpiece 19 may be used as part of a diver communication system such as that disclosed in U.S. Pat. No. 3,789,353 for "Diver Communication System", issued on Jan. 29, 1974 to Earl Kent Hunter et al. Similarly, the individual acoustic receivers 18 may be a conventional underwater type including those shown and described in U.S. Pat. No. 3,562,451 for "Microphone and Headset for Underwater Swimmer", issued on Feb. 9, 1971 to Walter W. Mullen, Jr. et al.

Referring to FIG. 3, a master clock 25 produces a triggering output signal which is coupled to broadband signal generator 26. Master clock 25 may be any conventional sonar master timing circuit which produces a time varied gain controlling signal and a clocking signal. Such circuits are well known in the sonar arts and choice among these is considered within the preview of one skilled in the art. Broadband signal generator 26 is connected to a suitable power amplifier 27. which amplifies the transmitted pulse before connecting it to transducer 28. Transducer 28 may be a conventional electroacoustic transducer capable of handling the requisite power and frequency in distribution. For example, that shown in U.S. Pat. No.. 3,569,921 issued on Mar. 9, 1971 to Willis A. Teel for "Cylinder-Rod dual Resonant Transducer Array" or U.S. Pat. No. 3,470,394 issued on Sep. 30, 1969 to Rufus L. Cook et al. for "Double Serrated Crystal Transducer". The ideal wave forms for the transmitted pulse are shown in FIGS. 4 and 5.

Referring to FIG. 4, it may be seen that in tie duration, the transmitted pulse, as represented by curve 53, occupies a time extent generally indicated as extending from $t_0$ to $t_1$. This follows standard ranging notation at which $t_0$ indicates the instant of transmission. The actual length of time depends upon the frequency employed and the desired object resolving power. However, for purposes of illustration, it may be considered that $t_1$ is approximately 1 millisecond after $t_0$.

Referring to FIG. 5 a similarly broad uniform high pulse as represented by curve 54 as extending between frequency $f1$ and frequency $f2$. A variety of parameters are used in determining the frequency limits of the system, such as object resolution required and range limiting acoustic attenuation. In addition, if it is important not to interfere with the hearing of swimmer-diver 12 or to permit audible detection of the ensonifying pulse, a frequency for $f1$ will be chosen in excess of the upward threshold of human hearing. Thus, frequency $f1$ may be above 20 kHz and extend upwardly to 100 kHz. On the other hand, if it is not important that the ensonifying pulses be heard, a lower frequency limit for frequency $f1$ may be chosen. In such instances, a frequency of 1,000 to 10,000 Hz may be employed.

It is an observed fact that human hearing produces the maximum accuracy in binaural localization of sounds when the sounds reach the hearer's ears in the frequency range from 1 to 3 kHz. Therefore, the time stretching technique of the invention is chosen to have an audible output in this maximum efficiency range. Thus, if the time stretching ratio is chosen as ten-to-one, a desirable ratio, the frequency range covered by curve 54 may extend between 10 kHz. The time stretching is also effective to make the sterophonic delay to the ears of swimmer-diver 12 to approximate the air transmission rate of sound. Accordingly, the parameters for predetermining the frequency of the ensonifying energy are initial design configurations and include detectability, size resolution, and time stretching capability.

Referring again to FIG. 3, it will be observed that echo returns impinge transducers 29 and 31 to produce electrical analog signals thereof. Transducers 29 and 31 are chosen to have broad angular response, somewhat less than that of the human ear to limit noise, and are positioned to have a composite reception pattern closely approximating that of the swimmer-diver.

The analog signals from transducers 29 and 31 are amplified by means of amplifiers 33 and 32. The output of amplifiers 33 and 32 are connected to time varying gain circuits 34 and 35 which receive a signal from master clock 25 to control their time dependent gain increase. The use of time varying gain circuits is well understood in the sonar arts and compensates for attenuation in the medium such that the output of these circuits are pulses having a constant amplitude despite their correspondence to echo pulses 16' being returned from different ranges.

The output of time varying gain circuits 34 and 35 are amplified by means of recording amplifiers 36 and 37 which, in turn, are coupled to recording heads 38 and 39. Amplifiers 36 and 37 are recorded heads 38 and 39 are conventional state-of-the-art devices.

A second output from master clock 25 is connected to the input of amplifier 41. The output of amplifier 41 is connected to a recording head 42 and functions to record a series of time signals which correspond to predetermined ranges on a magnetic tape 40. The range interval between these clock pulses may be chosen to correspond to a desired range interval on acoustic playback. For example, range intervals corresponding to ranges in the 50 to 300 foot range have proven useful in developmental models.

As shown, magnetic tape 40 is an endless loop and is driven by means of a deive capstan 51 and idler pully 52 associated therewith.

Figure 6:
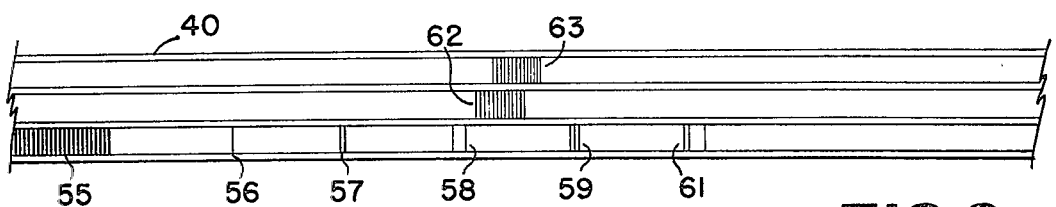
FIGS. 6 and 7 are visual representations of the recorded signals according to the invention.

Referring to FIG. 6, a length of recording tape 40 is illustrated with the presence of magnetically recorded signals indicated by transverse lines thereon. As shown, the timing track placed on the tape 40 by recording head 42 includes a transmitter pulse 55 and a series of timing pulses indicated at 56, 57, 58, 59, and 61. As shown, these recorded timing pulses may be coded in a well understood binary fashion such as used in data processing such that a given range interval may be selected by appropriate playback mechanisms. As shown, the signals lie in a marginal track although this placement is optional and, if desired, a central location may be used. The stereophonically related signals placed on tape 40 by recording heads 38 and 39 are represented by signals 62 and 63, respectively. It should be noted that the stereophonic time separation between signals 62 and 63 has bee exaggerated for clarity of illustration. Signals 62 and 63 lie in separate tracks parallel to and spaced from that containing the time pulses.

Figure 7:
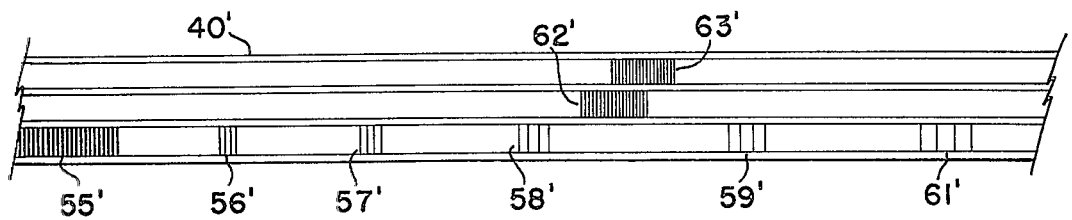

Refering to FIG. 7, a similar section of tape is indicated at 40' and each of the signals referred to in the discussion of FIG. 6 dis indicated with a similar number carrying the primed notation. It will be observed, that the timing pulses of FIG. 7 do not include the binary coding of that of FIG. 6 but simply represent audio tones. As suggested by the spacing of the lines of the timing pulses 56' and 57' etc., shown in FIG. 7, the frequency of the individual pulses may, if desired, be varied to assist swimmer-diver 12 in approximating range from which the echo return originates.

Referring again to FIG. 3, it will be observed that the series of playback heads 43, 44, and 47 are also positioned in operative relationship to endless tape 40. Playback head 47 senses the timing pulses and applies them to a tape drive control 48 as well as playback amplifiers 45, and 46. Playback heads 43 and 44 are positioned to respond to echo returns placed on magnetic tape 40 by recording heads 38 and 39. The outputs of playback heads 43 and 44 are connected to playback amplifiers 45 and 46. Tape drive control 48 controls tape drive motor 49 in response to the presence of transmission pulses 55 and 55' to change the speed of playback motor 49 such that magnetic tape 40 may be driven at eigher the fast, record speed or the slower, playback speed, Tape drive control 48 also has an output to "turn off" playback amplifiers 45 and 46 during the recording interval. This quieting of playback amplifiers 45 and 46 prevents swimmer-diver 12 from hearing the timing pulses and received echo pulses in real time.

The output from playback amplifiers 45 and 46 is connected to a receiver 18 by means of a cable 22 as previously described in connection with FIG. 2.

MODE OF OPERATION

Mode of operation of the device of the invention is essentially the mode of electronic circuits aforedescribed. That is, when swimmer-diver 12 is in turbid waters or in darkness such that visual observation of object 13 is impossible, he may initiate operation of the sonar system 15. Transducer 29 periodically ensonifies an area with an ensonifying pulse 16 which produces echoes 16' from object 13. The echo pulse 16' impinges a pair of spaced hydrophones 29 and 31 whose outputs are processed in a stereophonic fashion and recorded at a real time rate on a recording medium such as magnetic tape 40. Magnetic tape 40 is played back at a slower speed to stretch the time interval between incoming signals and to place their audio frequency in an acoustic range which is chosen to correspond to the optimum localization frequency range of the swimmer-diver 12, and stretched for optimum range resolution. The echo returns are played back by binaural amplifiers 45 and 46 and presented to swimmer-diver 12 by means of receivers 18.

The foregoing description taken together with the appended claims constitutes a disclosure such as to enable a person skilled in the electronics and sonar arts and having the benefit of the teachings contained therein to make and use the invention. Further, the structure herein described meets the aforestated objects of invention, and, generally constitutes a meritorious advance in the art unobvious to such a skilled worker befret of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A swimmer carrier active sonar system comprising; ensonifying means for projecting acoustic energy into a volume of water adjacent the swimmer;

two spaced hydrophone means held in spaced relation to said ensonifying means for receiving echo returns from the acoustic energy in a stereo information pattern and converting them to electrical signals;

master clock means connected to said ensonifying means for production of clock signals having a predetermined frequency;

stereo information processing circuitry connected to said two spaced hydrophones for processing the electrical signals;

first magnetic recording head means connected to said stereo information processing circuitry for making a recording field adjacent thereto;

second magnetic recording head means effectively connected to said master clock means for producing a recording field adjacent thereto in response to the clock signals;

a magnetic tape positioned adjacent said first and second magnetic recording head means in the associated recording fields to record the magnetic fields adjacent thereto;

two speed tape transport means operatively engaging said magnetic tape for movement past said magnetic recording head means;

first magnetic playback head means positioned adjacent said magnetic tape to respond to signals recorded thereon by said first magnetic recording head means;

second magnetic playback head means positioned adjacent said magnetic tape to respond to signals recorded thereon by said second magnetic recording head means;

stereo signal replay circuit means connected to said first magnetic playback head means for amplifying the recorded signals to which said first magnetic playback head means responds;

tape drive control circuit means connected to said second magnetic playback head means and to said two speed tape transport means for altering the speed thereof in accordance with the response of said second magnetic playback head to signals recorded on said magnetic tape by said second magnetic recording head;

binaural electroacoustic transducers physically positioned adjacent the ears of the swimmer and electrically connected to said stero playback means for providing a spatial, aural reconstruction of echo return impinging said two spaced hydrophone means, whereby the diver may aurally locate the object producing the echo return during periods of replay at the lower of the two speeds of said tape transport due to heightened stereophonic illusion.

2. A swimmer carried sonar system according to claim 1 wherein said first and second magnetic recording heads are spaced laterally with respect to each other so as to record three parallel tracks.

3. A swimmer carried sonar system according to claim 1 in which said magnetic tape is an endless loop.

4. A swimmer carried sonar system according to claim 2 in which said magnetic tape is an endless loop.

5. A swimmer carried sonar system according to claim 1 in which said two speed tape transport means is configured to drive the tape at speeds which are related to each other to facilitate binarual echo location by the swimmer.

6. A swimmer carried sonar system according to calim 4 in which said two speed tape transport means is configured to drive the tape at speeds which are related to each other to facilitate binaural echo location by the swimmer.

7. A swimmer carried sonar system according to claim 1 wherein said binaural electroacoustic transducers are piezoelectric acoustic receivers adapted for use a swimmer communication instruments.

8. A swimmer carried sonar system according to claim 6 wherein said binaural electroacoustic transducers are piezoelectric acoustic receivers adapted for use as swimmer communication instruments.

9. A swimmer carried sonar according to claim 1 in which said ensonifying pulse is a broadband pulse having frequency components throughout a predetermined acoustic range.

10. A swimmer carried sonar according to claim 8 in which said ensonifying pulse is a braodband pulse having frequency components throughout a predetermined acoustic range.

11. A swimmer carried sonar according to claim 9 in which said ensonifying pulse has a lower frequency limit above 20 kHz.

12. A swimmer carried sonar according to claim 10 in which said ensonifying pulse has a lower frequency limit above 20 kHz.

* * * * *